United States Patent [19]
Naito et al.

[11] 3,911,237
[45] Oct. 7, 1975

[54] ROTATING SPEED DETECTING DEVICE

[75] Inventors: Michikatsu Naito, Nagoya; Kenji Yamada, Anjo; Yasuhiro Yamamoto, Kariya, all of Japan

[73] Assignee: Nippondenso Co., Ltd., Kariya, Japan

[22] Filed: Jan. 31, 1974

[21] Appl. No.: 438,260

[30] Foreign Application Priority Data
Mar. 27, 1973 Japan.................................. 48-35390

[52] U.S. Cl.......... 200/61.46; 73/517 R; 180/105 R; 200/61.39
[51] Int. Cl.².................... G01P 15/00; H01H 35/14
[58] Field of Search .. 200/61.45 R, 61.45 M, 61.46, 200/61.39, 80 R, 80 B; 73/518, 519, 517 R; 116/57; 340/264; 335/205–207; 180/105 R, 180/82 R, 82.1 NA, 105 E, 110

[56] References Cited
UNITED STATES PATENTS

| 2,849,560 | 8/1958 | Lucien ......................... 200/61.39 X |
| 2,920,154 | 1/1960 | Allen ........................... 200/61.46 X |
| 3,021,402 | 2/1962 | La Warre et al. ................ 73/519 X |
| 3,392,799 | 7/1968 | Ishikawa ......................... 180/105 R |
| 3,569,927 | 3/1971 | Guyton et al............... 200/61.39 X |
| 3,630,347 | 12/1971 | Davis ............................... 200/61.46 |

*Primary Examiner*—James R. Scott
*Attorney, Agent, or Firm*—Cushman, Darby & Cushman

[57] ABSTRACT

This invention relates to a device for detecting the rotation speed of a vehicle, especially to a device which can be connected between a transmission and a speed-meter. For this purpose, a bearing case is rotatably mounted on a rotary shaft which is connected to the transmission at one end and to the speed-meter at the other end by means of a flexible cable.

7 Claims, 5 Drawing Figures

ROTATING SPEED DETECTING DEVICE

BACKGROUND OF THE INVENTION

1. Field of the Invention

This invention relates in general to a rotating speed detecting device which can be used for controlling or operating some other device or circuit in accordance with the detected rotating speed.

2. Description of the Prior Art

It is well known in the art to provide a vehicle speed detecting device in which a pulse generating means is provided adjacent to a shaft, such as a wheel shaft for example, with electric signal pulses produced by the pulse generating means. An electric circuit is provided which receives and counts the pulses from the pulse generating means to provide an indication of the shaft or wheel rotating speed. However, a device of this type has a disadvantage of high cost due to necessity of much complicated electric circuits with a large number of electrical elements.

A vehicle speed detecting device of a mechanical type has also been employed, for example as exemplified by U.S. Pat. No. 3,392,799, which comprises a rotary shaft having a permanent magnet, with the rotary shaft connected to a transmission by means of a flexible cable. Another rotary spindle is provided with an extended contactor blade and also mounts a rotary disk which encloses the permanent magnet. As the permanent magnet is rotated due to transmission rotations, eddy currents generated at the rotary disk cause the rotary spindle to rotate by an angle corresponding to the transmission rotations.

However, such a device requires a flexible cable which is separated from that for a speed meter. In these days, vehicle speed is employed in various kinds of controlling systems such as, for example, a system for controlling vehicle speed, a system for controlling exhaust-gas emission and the like. These systems require various kinds of vehicle speed detectors.

SUMMARY OF THE INVENTION

The main object of the present invention is to provide a reliable and inexpensive rotating-speed-detecting device.

To this end and in accordance with the present invention, there is provided a permanent magnet fixed to a shaft and being rotated therewith, a nonmagnetic metal rotor rotatably mounted on the shaft and positioned around the permanent magnet, another permanent magnet integrally mounted on the metal rotor and a reed switch fixed to a housing, whereby the reed switch is actuated to close when the another permanent magnet is positioned to face the reed switch as the rotor rotates due to eddy currents on said rotor produced during rotation of the permanent magnet.

DESCRIPTION OF THE PREFERRED EMBODIMENTS

Figure 1A:
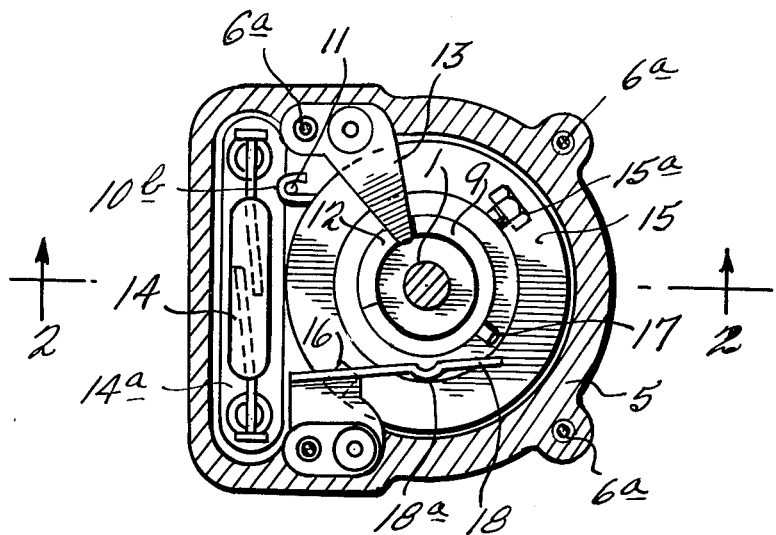
FIG. 1 is a transverse sectional view taken along the lines 1A—1A of FIG. 2 showing a preferred embodiment of the present invention.
FIG. 1B is similar to FIG. 1A and illustrates operation of the speed detecting device of this invention.
Figure 1B:
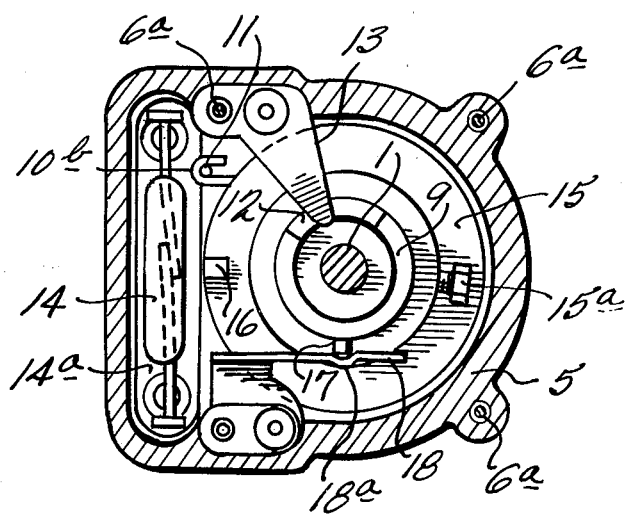
Figure 2:
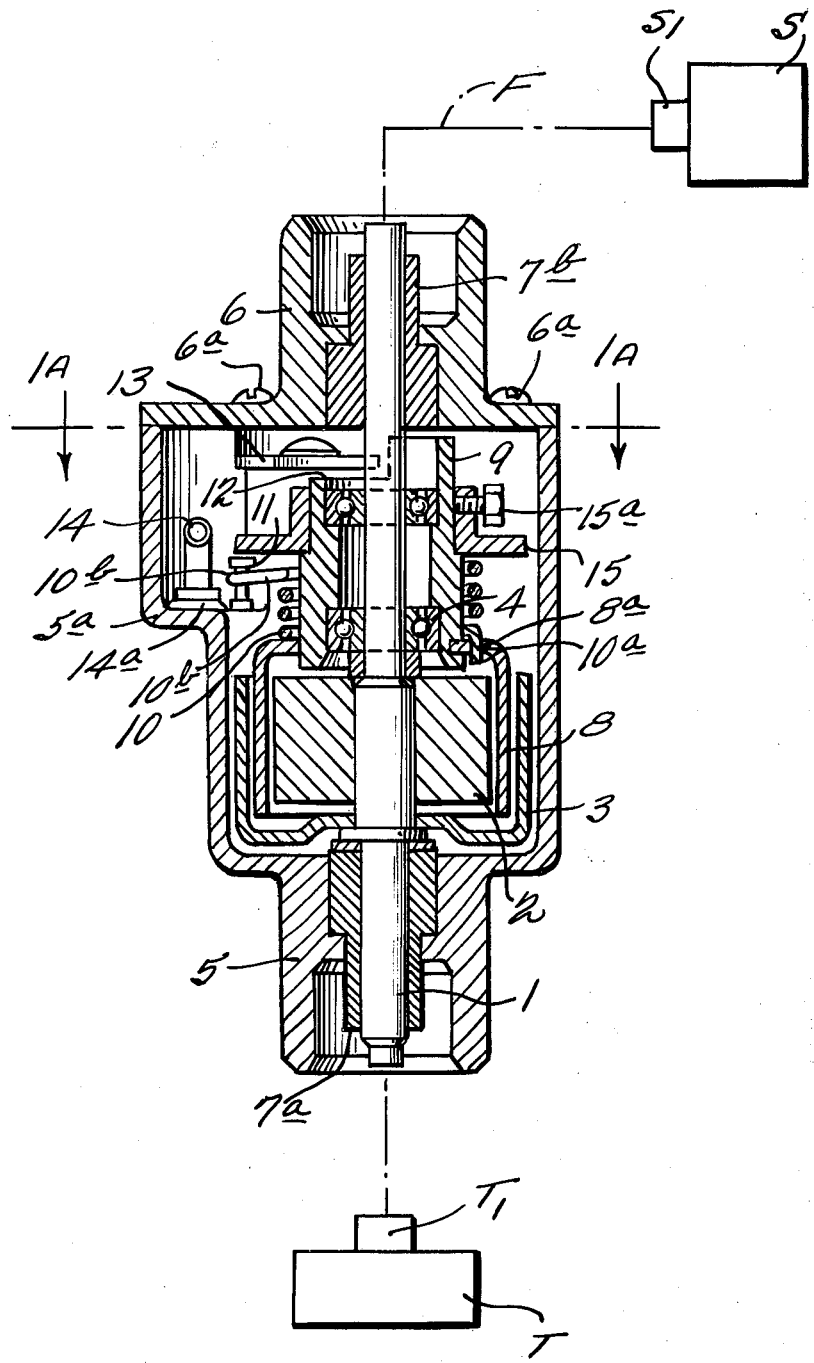
FIG. 2 is a longitudinal sectional view taken along the lines 2—2 of FIG. 1A.

Referring now to FIGS. 1A, 1B and 2, a round permanent magnet 2 magnetized circumferentially with N and S poles, one after the other, is secured to a rotary shaft 1. A cylindrical yoke 3 is also secured to rotary shaft 1 and encloses the permanent magnet 2. Two ball bearings 4 are secured to the rotary shaft 1. A housing 5 is provided along with a housing cover 6 fitted to the housing by screws 6a. Bushings 7a and 7b are mounted respectively in the housing 5 and cover 6 for rotatably supporting the rotary shaft 1 at both its ends. A bearing case 9 is provided which carries outer races of the ball bearings 4. A rotor 8 is secured to the bearing case 9 at its end and is positioned between the permanent magnet 2 and the cylindrical yoke 3. The rotor 8 is made of a nonmagnetic but conductive material such as brass, aluminum or the like and is cylindrical so that it encloses the permanent magnet 2.

Accordingly, the rotor 8 can rotate freely with respect to the rotary shaft 1 through the ball bearings 4. A small hole 8a is provided at the end of the rotor 8 and one end 10a of a coil spring 10 is inserted to be held therein. A hanger 11 is provided to which the other end 10b of said coil spring 10 is attached.

A groove 12 is provided at one end of the bearing case 9. The housing 5 has a stopper 13 fixed thereto, which stopper engages with the groove 12. A reed switch 14 is mounted to a shoulder portion 5a of housing 5 by an insulator 14a. A speed adjuster 15 is fixed to the bearing case 9 by means of a bolt 15a, with the speed adjuster positioned in the same plane as reed switch 14. a permanent magnet 16 is mounted on the speed adjuster 15. As particularly shown in FIG. 1B, the permanent magnet 16 is mounted such that it is positioned adjacent the reed switch 14 when the rotor 2 rotates by a certain angle corresponding to a selected speed.

One end of the rotary shaft 1 is connected to an output shaft T1 of a transmission T whose number of rotations are to be detected, while the other end of the rotary shaft 1 is connected through a flexible cable F to an input shaft S1 of a speed meter S installed in a vehicle.

In operation, as the permanent magnet 2 is rotated in proportion to the vehicle speed, an eddy current is generated at the rotor 8 due to the changes of the magnetic flux of the permanent magnet 2, whereby a rotative force is generated on the rotor 8 in accordance with Fleming's left-hand rule so that it rotates by such an angle that the rotative force balances with the spring action of the coil spring 10. Needless to say, the angle by which the rotor 8 rotates increases as the vehicle speed increases to generate a larger rotative force. And when the vehicle speed reaches the selected vehicle speed, the permanent magnet 16 mounted on the speed adjuster 15 faces the reed switch 14, whereby the lead switch 14 is actuated to close by the magnetic force of the permanent magnet 16.

A device (not shown) operating in response to the selected vehicle speed can be supplied with electric current by the closing of the reed switch 14. It is a general requirement for a device operating in response to a selected vehicle speed that the device should be supplied with electric current so that it is operated even when the vehicle speed exceeds the selected speed. Therefore, the groove 12 is so designed that the permanent magnet 16 faces the reed switch 14 so as to close it even when the vehicle speed exceeds the selected speed. To that purpose, the stopper 13 is inserted into the groove 12 to touch an end thereof, thereby to hold the rotor 8 in the position where the permanent magnet 16 faces the reed switch 14, thus holding the reed switch 14 in closed position. On the other hand, a certain kind of application requires that the reed switch 14 should be held in closed position for a while after the vehicle speed has fallen from the selected speed. For this purpose a setting pin 17 is fixed to the bearing case 9.

Figure 3A:
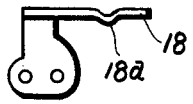
FIGS. 3A and 3B show a plate spring employed in the device of the present invention.
Figure 3B:
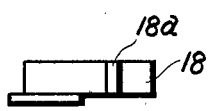

As shown in FIGS. 3A and 3B a plate spring 18 is provided with a concave portion 18a for engaging with the setting pin 17. The plate spring 18 is so fixed to the housing that the concave portion 18a engages with the setting pin 17 when the vehicle speed reaches the selected speed so that the rotor 8 is held for a while in the position where the permanent magnet 16 faces the reed switch 14 by the spring action of the plate spring 18 when the vehicle speed begins to fall from the selected speed. This condition is illustrated in FIG. 1B. When vehicle speed falls from the selected speed, the rotative force applied to the rotor 8 by the eddy currents decreases with the decrease of the vehicle speed. The rotor 8 is held in the position where the setting pin 17 engages with the concave portion 18a by the combination of the balancing force of the rotative force applied to the rotor 8, the spring action of the coil spring 10 and the spring action of the plate spring 18. However, the balancing force is destroyed due to a further decrease of the vehicle speed, and at last the setting pin 17 disengages from the concave portion 18a, whereby the permanent magnet 16 is separated from the reed switch 14 thereby opening the reed switch 14. It is therefore noted that the hysteresis of the reed switch, namely the period of the reed switch being in closed state for vehicle speed decreasing below the selected speed, is determined and can be changed by charging . . . plate spring 18. In this embodiment which employs the reed switch 14 and the permanent magnet 16, as shown in FIGS. 1A, 1B 2, the setting pin 17 and the plate spring 18 are not always necessary to provide the hysteresis of the reed switch. A detailed explanation is as follows. When the permanent magnet 16 is moved to face reed switch 14, the reed switch 14 is magnetized by the magnetic force of the permanent magnet 16. And once the reed switch 14 is closed, the reed switch is held in its closed state for a while due to residual magnetism in the reed switch, even when the permanent magnet 16 is moved away from the reed switch 14. Therefore the reed switch 14 changes its open state when the permanent magnet 16 is positioned further apart from reed switch 14 in comparison with the position of the permanent magnet when the reed switch changes to a closed state. Consequently, the characteristic of the reed switch itself provides the hysteresis.

Figure 4:
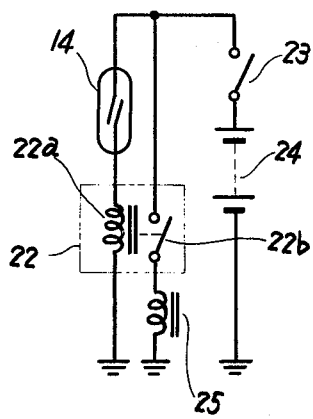
FIG. 4 is a schematic diagram of a circuit employed in the present invention.
Figure 5A:
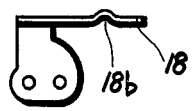
FIGS. 5A and 5B show another plate spring which may be employed in the present invention.
Figure 5B:

Referring now to FIG. 4, there is shown an electric circuit including the reed switch 14, an operating switch 23, a battery 24, and a relay 22 having a relay coil 22a and a normally open relay contact 22b which is actuated to close by magnetomotive force generated in coil 22a. Means such as a controlling coil 25 is provided which can be associatd with a device operating in response to the selected speed, such as a magnetic valve, a magnetic clutch or the like. When the vehicle speed exceeds a predetermined value, the reed switch 14 closes so that electric current from the battery 24 flows through the relay coil 22a by way of reed switch 14. Consequently, relay contact 22b closes, and the electric current from battery 24 flows through controlling coil 25 by way of operating switch 23 and relay contact 22b. Thus the device with which controlling coil 25 is associated (such as a magnetic valve) begins to operate. In this case, since the reed switch 14 has a hysterisis action, the relay 22 is free from any chattering action, so that the magnetic valve or the like operates positively.

FIGS. 3A and 3B shows another embodiment of the plate spring, in which convex portion 18b is provided on the plate spring 18 instead of the concave portion 18a on the plate spring shown in FIGS. 3A and 3B.

Although a reed switch is employed in the described specific embodiment of the present invention, a mechanical switch means may be, of course, employed.

What is claimed is:

1. A rotating speed detecting device for use with a speed meter comprising;
   a housing (5);
   a rotary shaft (1) connected to a transmission at one end thereof and rotatably mounted in said housing;
   the other end of said rotary shaft being connected to said speed meter,
   a round permanent magnet (2) secured on said rotary shaft;
   a rotor (8) made of nonmagnetic and conductive material and enclosing said room permanent magnet;
   and a coil spring (10) hung on said housing at one end thereof and on said rotor at the other end for biasing said rotor against the rotation,
   wherein the improvement comprises;
   a bearing case (9) rotatably mounted on said rotary shaft and on which said rotor is secured;
   another permanent magnet (16) secured to said bearing case to be rotated therewith;
   a groove (12) provided at said bearing case;
   a stopper means (13) mounted on said housing and engaging with said groove; and
   a reed switch means mounted on said housing.

2. A rotating speed detecting device according to claim 1 further comprising;
   a setting pin (17) mounted on said bearing case; and
   a plate spring (18) mounted on said housing and provided with a portion engaging with said setting pin, whereby said rotor is kept in a position where said setting pin and said portion engage with each other for a while due to a spring action of said plate spring after the rotating speed has decreased.

3. A rotating speed detecting device for use with a transmission and a speed meter comprising a housing; a rotary shaft mounted in said housing for rotation therein, one end of said rotary shaft being coupled to the transmission and the other end of said rotary shaft being coupled to the speed meter; a permanent magnet fixed to said rotary shaft for rotation therewith; a bearing case rotatable mounted on said rotary shaft; a rotor made of nonmagnetic and conductive material, said rotor fixed to said bearing case and enclosing said permanent magnet; a spring having one of its ends fixed to said housing and its other end fixed to said rotor for biasing said rotor against rotation; an additional permanent magnet fixed to said bearing case for rotation therewith; and a reed switch mounted on said housing, said reed switch mounted such that it closes when said bearing case rotates sufficiently due to rotation of said rotary shaft at a predetermined speed to bring said additional permanent magnet in proximity to said reed switch.

4. A rotating speed detecting device in accordance with claim 3 wherein said bearing case has a grooved portion, and including a stopper means mounted on said housing for engagement with said grooved portion for preventing said bearing housing from further rotation past the point where said additional permanent magnet is in proximity to said reed switch.

5. A rotating speed detecting device as in claim 3 wherein said reed switch is of the type having a magnetic hysteresis effect so that after it closes in response to proximity of the additional permanent magnet it remains closed a predetermined period after removal of said additional permanent magnet from proximity thereto.

6. A rotating speed detecting device as in claim 3 including a setting pin fixed to said bearing case and a plate spring mounted on said housing and being provided with a spring portion engaging with said setting pin, said spring portion having a detent engagable with said setting pin for a predetermined position of said bearing case and rotor whereby said setting pin and said detent engage with each other to maintain said bearing case and rotor in a position where the additional permanent magnet is in proximity to said reed switch for a limited time after said rotating shaft decreases in speed from the predetermined speed.

7. A rotating speed detecting device as in claim 3 wherein said permanent magnet is a round permanent magnet.

* * * * *